(12) United States Patent
Shepley et al.

(10) Patent No.: US 9,975,451 B2
(45) Date of Patent: May 22, 2018

(54) METHOD AND APPARATUS FOR THE DETERMINATION OF REGENERATIVE BRAKING CAPACITY IN A VEHICLE WITH A STEP-GEAR TRANSMISSION

(71) Applicant: GM GLOBAL TECHNOLOGY OPERATIONS LLC, Detroit, MI (US)

(72) Inventors: Luke D. Shepley, Novi, MI (US); Joshua F. Pacheco, Berkley, MI (US); Krunal P. Patel, Sterling Heights, MI (US); Anthony H. Heap, Ann Arbor, MI (US); Michael Andrew Miller, Fenton, MI (US); Michael V. Woon, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/130,383

(22) Filed: Apr. 15, 2016

(65) Prior Publication Data

US 2016/0362020 A1 Dec. 15, 2016

Related U.S. Application Data

(60) Provisional application No. 62/174,773, filed on Jun. 12, 2015.

(51) Int. Cl.
*B60L 9/00* (2006.01)
*B60L 15/20* (2006.01)
(Continued)

(52) U.S. Cl.
CPC .......... *B60L 15/2009* (2013.01); *B60K 6/485* (2013.01); *B60L 7/14* (2013.01);
(Continued)

(58) Field of Classification Search
USPC ........................................................... 701/22
See application file for complete search history.

(56) References Cited

U.S. PATENT DOCUMENTS 6,070,680 A * 6/2000 Oyama .................... B60K 6/48
180/65.25
2003/0015874 A1 1/2003 Abe et al.
(Continued)

FOREIGN PATENT DOCUMENTS

CN 1476396 A 2/2004

*Primary Examiner* — Tyler Paige
(74) *Attorney, Agent, or Firm* — Quinn IP Law

(57) ABSTRACT

A powertrain system including an internal combustion engine, a transmission and an electric machine is described, and includes the electric machine rotatably coupled to a crankshaft of the internal combustion engine. The transmission is coupled to a driveline to transfer tractive torque and braking torque thereto. A method for controlling the electric machine includes determining a short-term axle torque capacity, a long-term axle torque capacity and a maximum regenerative braking stall torque capacity, and determining an operator request for braking. A preferred regenerative braking capacity is determined based upon the short-term axle torque capacity, the long-term regenerative braking capacity, the engine stall regenerative braking capacity and the operator request for braking. Torque output from the electric machine is controlled based upon the preferred regenerative braking capacity.

20 Claims, 5 Drawing Sheets

(51) Int. Cl.
*B60W 20/14* (2016.01)
*B60L 7/14* (2006.01)
*B60W 50/00* (2006.01)
*B60K 6/485* (2007.10)
*B60W 10/08* (2006.01)
*B60W 20/00* (2016.01)

(52) U.S. Cl.
CPC ............ *B60W 10/08* (2013.01); *B60W 20/00* (2013.01); *B60W 20/14* (2016.01); *B60W 50/0097* (2013.01); *B60L 2240/423* (2013.01); *B60L 2240/463* (2013.01); *B60L 2240/486* (2013.01); *B60L 2250/26* (2013.01); *B60W 2510/1005* (2013.01); *B60W 2520/30* (2013.01); *B60W 2540/14* (2013.01); *B60W 2710/083* (2013.01); *Y02T 10/6226* (2013.01); *Y02T 10/7258* (2013.01); *Y10S 903/947* (2013.01)

(56) References Cited

U.S. PATENT DOCUMENTS

| | | | |
|---|---|---|---|
| 2005/0228553 A1 | 10/2005 | Tryon | |
| 2007/0021267 A1* | 1/2007 | Obayashi | B60K 6/46 477/107 |
| 2011/0153127 A1* | 6/2011 | Weslati | B60W 50/085 701/22 |
| 2012/0109408 A1* | 5/2012 | Siy | B60L 1/02 701/1 |
| 2014/0139189 A1* | 5/2014 | Izumi | B60L 11/1861 320/134 |
| 2014/0277876 A1* | 9/2014 | Holmes | B60W 10/06 701/22 |
| 2015/0298680 A1* | 10/2015 | Matthews | B60W 20/00 701/22 |
| 2016/0049821 A1* | 2/2016 | Aridome | B60L 11/1861 320/128 |
| 2017/0021825 A1* | 1/2017 | Burt | B60W 20/30 |

* cited by examiner

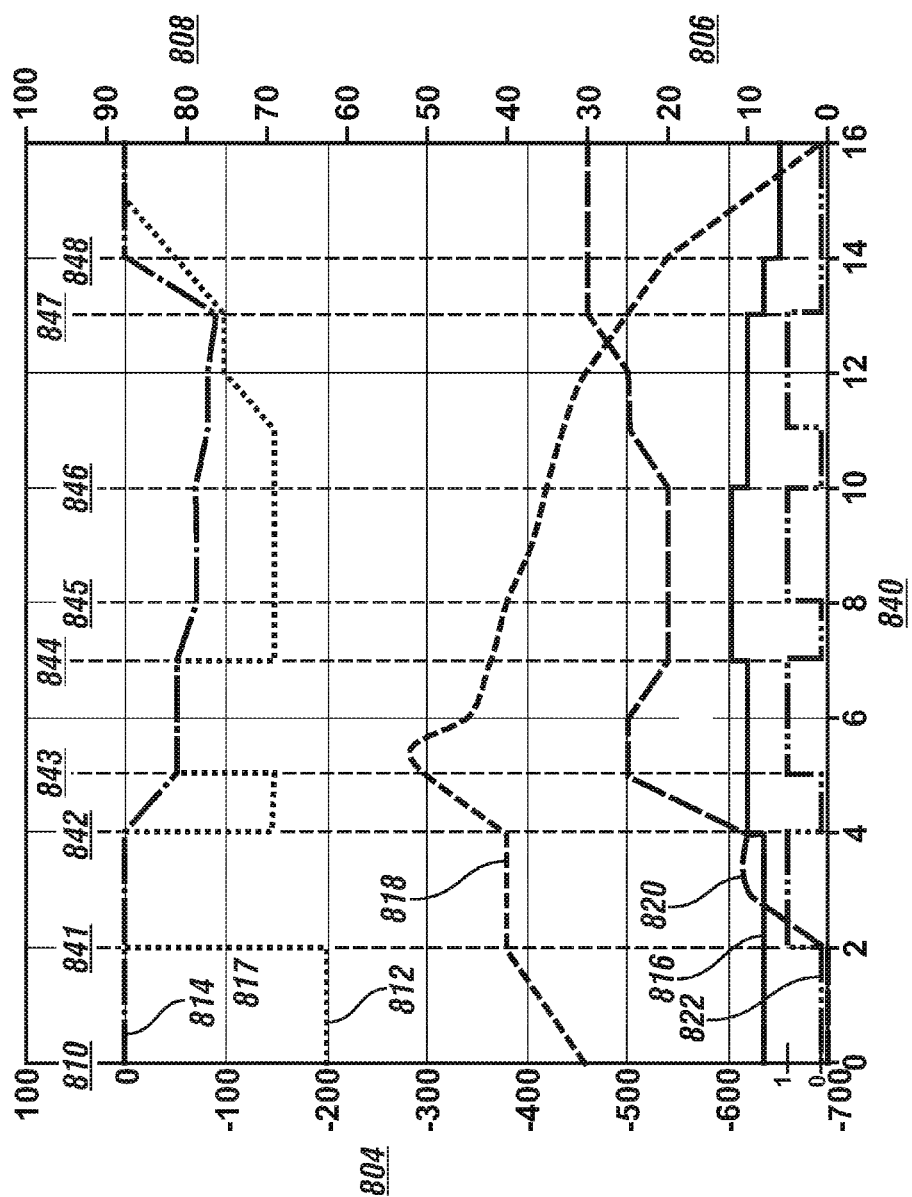

METHOD AND APPARATUS FOR THE DETERMINATION OF REGENERATIVE BRAKING CAPACITY IN A VEHICLE WITH A STEP-GEAR TRANSMISSION

CROSS-REFERENCE TO RELATED APPLICATIONS

This application claims the benefit of U.S. Provisional Patent Application No. 62/174,773 filed on Jun. 12, 2015, the disclosure of which is hereby incorporated by reference.

TECHNICAL FIELD

The present disclosure relates to powertrain systems for vehicles, and control related thereto.

BACKGROUND

Known vehicle powertrain systems include internal combustion engines and electric motor/generators that are coupled to transmissions to transfer torque to a driveline for tractive effort. Known electric motor/generators are supplied electric power from high-voltage energy storage systems. Powertrain systems may employ regenerative control systems to recover electric power for charging the high-voltage energy storage system in response to operator commands that include braking and/or coasting.

SUMMARY

A powertrain system including an internal combustion engine, a transmission and an electric machine is described, and includes the electric machine rotatably coupled to a crankshaft of the internal combustion engine. The transmission is coupled to a driveline to transfer tractive torque and braking torque thereto. A method for controlling the electric machine includes determining a short-term axle torque capacity, a long-term axle torque capacity and a maximum regenerative braking stall torque capacity, and determining an operator request for braking. A preferred regenerative braking capacity is determined based upon the short-term axle torque capacity, the long-term regenerative braking capacity, the engine stall regenerative braking capacity and the operator request for braking. Torque output from the electric machine is controlled based upon the preferred regenerative braking capacity.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 8 graphically shows operation of portions of the regenerative braking torque capacity control routine on an embodiment of the vehicle including the powertrain system described herein, in accordance with the disclosure.

DETAILED DESCRIPTION

Figure 1:
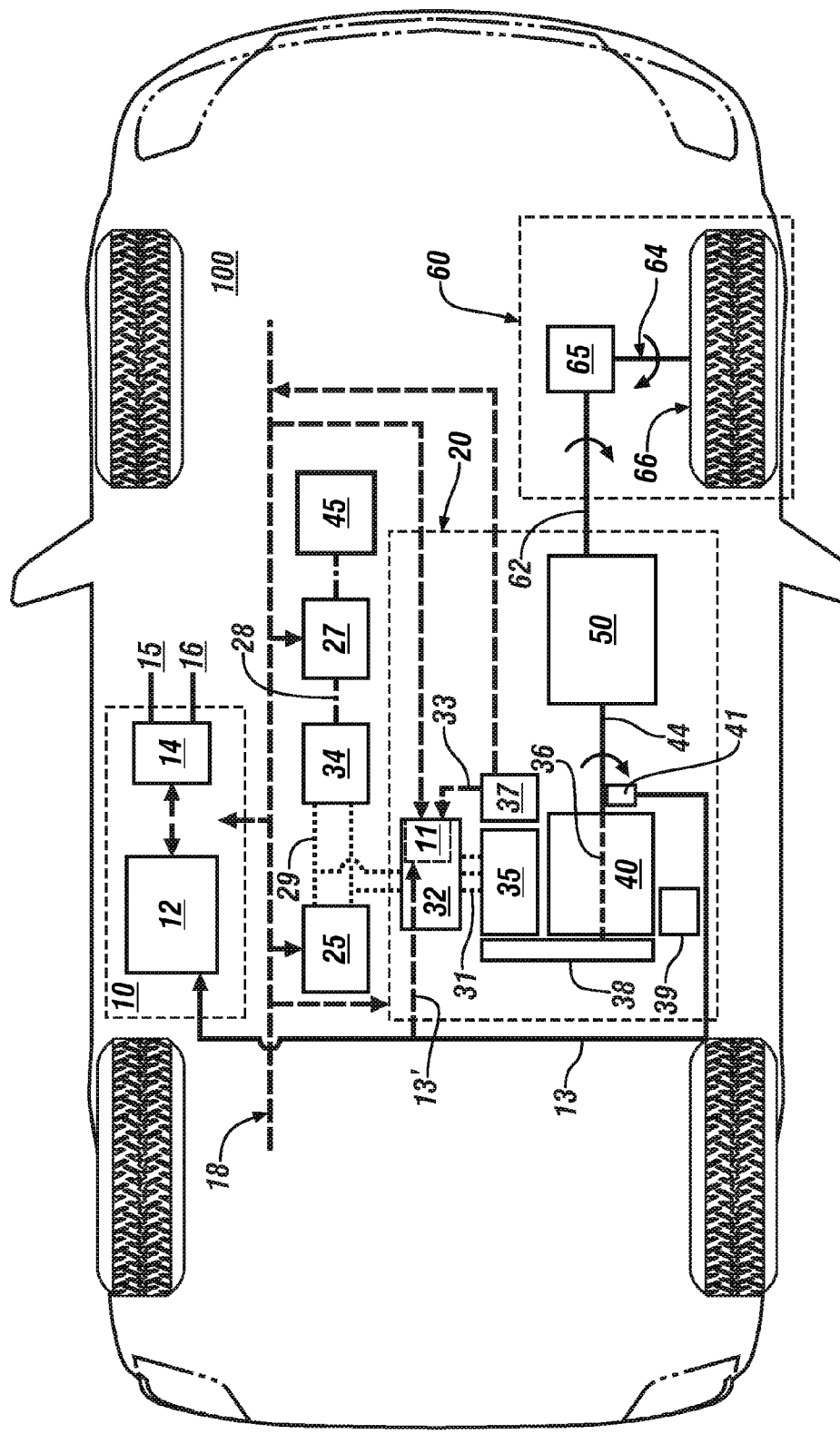
FIG. 1 schematically illustrates a vehicle including a powertrain system that includes an internal combustion engine having a crankshaft that couples to a transmission via a torque converter and couples to an electrically-powered torque machine, wherein the transmission is a step-gear transmission that couples to a driveline, in accordance with the disclosure.
Figure 2:
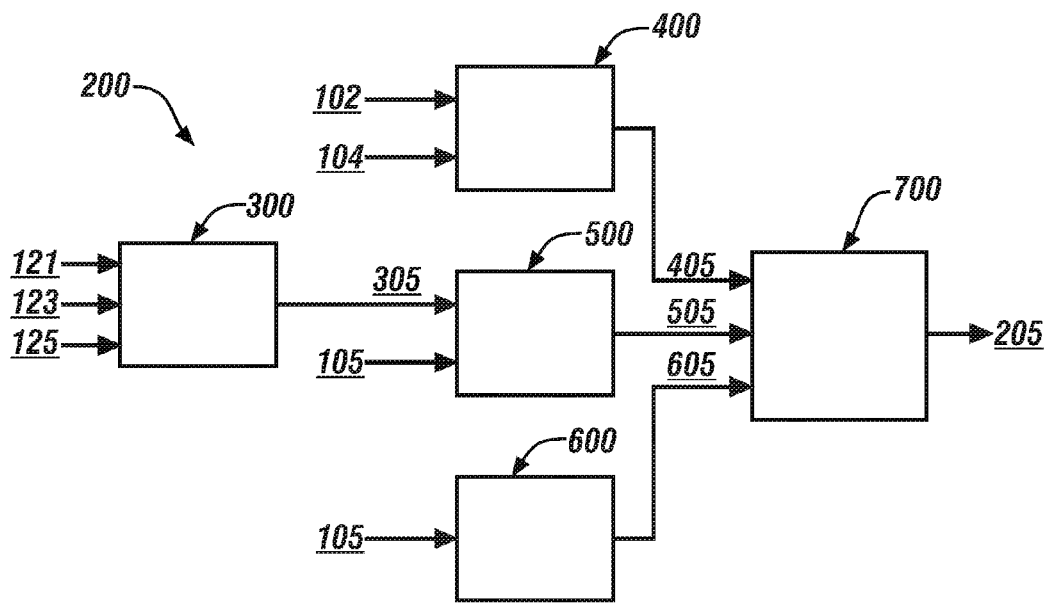
FIGS. 2 through 7 schematically show flowcharts detailing a regenerative braking torque capacity control routine for controlling an embodiment of the powertrain system to transfer tractive torque and braking torque to the driveline, in accordance with the disclosure.

Referring now to the drawings, wherein the depictions are for the purpose of illustrating certain exemplary embodiments only and not for the purpose of limiting the same, FIG. 1 schematically illustrates a vehicle 100 including a powertrain system 20 having a step-gear transmission 50 that is coupled to a driveline 60 and controlled by a control system 10. Like numerals refer to like elements throughout the description.

The powertrain system 20 includes an internal combustion engine 40 that includes a crankshaft 36 that mechanically couples to the transmission 50 via a torque converter 44. The crankshaft 36 mechanically rotatably couples to an electrically-powered torque machine 35 via a pulley mechanism 38 or another suitable mechanism. The electrically-powered torque machine 35 and the internal combustion engine 40 are torque-generating devices. The electrically-powered torque machine 35 includes an output member that mechanically rotatably couples to the crankshaft 36 of the engine 40 via the pulley mechanism 38, which provides a mechanical power path therebetween. The pulley mechanism 38 is configured to effect torque transfer between the engine 40 and the torque machine 35, including transferring torque from the torque machine 35 to the engine 40 for engine autostart/autostop operation, tractive torque assistance, and regenerative braking, and transferring torque from engine 40 to the torque machine 35 for high-voltage electrical charging. In one embodiment, the pulley mechanism 38 includes a serpentine belt routed between the pulley attached to the crankshaft 36 of the engine 40 and another pulley attached to a rotating shaft coupled to a rotor of the torque machine 35, referred to as a belt-alternator-starter (BAS) system. Alternatively, the pulley mechanism 38 may include a positive-displacement gearing mechanism. The transmission 50 includes an output member 62 that couples to the driveline 60. In one embodiment, the engine 40 may include a low-voltage solenoid-actuated electrical starter 39 for starting in response to a key-crank event in one embodiment.

The engine 40 is preferably a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an output torque request. The sensing devices include a crankshaft position sensor 41, which can be any suitable rotational position sensing system, and preferably directly communicates via a wiring harness 13 to control module 12 and communicates via a communications bus 18 to inverter controller 11. Alternatively, the crankshaft position sensor 41 directly communicates via wiring harness 13 to control module 12 and directly communicates via a second wiring harness 13' to inverter controller 11.

The torque machine 35 is preferably a high-voltage multi-phase electric motor/generator configured to convert stored electric energy to mechanical power and convert mechanical power to electric energy that may be stored in a high-voltage battery 25. The torque machine 35 includes a rotor and a stator and an accompanying position sensor 37 which is a resolver in one embodiment. The position sensor 37 communicates directly to the inverter controller 11 via harness 33 and is employed to monitor rotational position of the rotor of the torque machine 35. The rotational position of the rotor of the torque machine 35 is used by the inverter controller 11 to control operation of an inverter module 32 that controls the torque machine 35. The inverter controller 11 is preferably co-located within the inverter module 32 (as shown) or, alternatively, may be remotely located, e.g., within control module 12.

The high-voltage battery 25 electrically connects to the inverter module 32 via a high-voltage DC bus 29 to transfer high-voltage DC electric power to the torque machine 35 in response to control signals originating in the control system 10. The inverter module 32 electrically connects to the torque machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25, including as part of a regenerative control strategy. It is appreciated that the inverter module 32 is configured to receive motor control commands and control inverter states to provide the motor drive and regeneration functionality.

In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 may electrically connect to an auxiliary power system 45 to provide low-voltage electric power to low-voltage systems on the vehicle, including, e.g., electric windows, HVAC fans, seats, and the low-voltage solenoid-actuated electrical starter 39 in one embodiment. Alternatively, the electric power converter 34 may provide low-voltage electric power to the low-voltage systems on the vehicle, thus supplanting the auxiliary power system 45.

The torque converter 44 is a rotatable torque coupling device arranged between the engine 40 and transmission 50. The torque converter 44 preferably includes fluid torque coupling via an internal pump and vanes and mechanical torque coupling via a controllable selectively activatable clutch mechanism.

The transmission 50 is preferably arranged in a step-gear configuration, and may include one or more differential gear sets and activatable clutches configured to effect torque transfer in one of a plurality of step-gear states over a range of speed ratios between the engine 40 and the output member 62. The transmission 50 includes any suitable configuration, and is preferably configured as an automatic transmission to automatically shift between the step-gear states to operate at a gear ratio that achieves a preferred match between an output torque request and an engine operating point. The transmission 50 automatically executes upshifts to shift to a gear state having a lower numerical multiplication ratio (gear ratio) and executes downshifts to shift to a gear state having a higher numerical multiplication ratio. A transmission upshift requires a reduction in engine speed so the engine speed matches transmission output speed multiplied by the gear ratio at a gear ratio associated with the target gear state. A transmission downshift requires an increase in engine speed so the engine speed matches transmission output speed multiplied by the gear ratio at a gear ratio associated with the target gear state. The driveline 60 may include a differential gear device 65 that mechanically couples to an axle 64 or half-shaft that mechanically couples to a wheel 66 in one embodiment. The driveline 60 transfers tractive power between the transmission 50 and a road surface. The powertrain system 20 is illustrative, and the concepts described herein apply to other powertrain systems that are similarly configured.

The control system 10 includes control module 12 that communicates to an operator interface 14. The control module 12 preferably communicates with individual elements of the powertrain system 20 either directly or via the communications bus 18. The control module 12 communicates to the sensing devices of each of the high-voltage battery 25, the inverter module 32, the torque machine 35, the engine 40 and the transmission 50 to monitor operation and determine parametric states thereof. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal 15, a brake pedal 16, a transmission range selector (PRNDL), a steering wheel, and a headlamp switch. The accelerator pedal 15 provides signal input including an accelerator pedal position indicating an operator request for vehicle acceleration and the brake pedal 16 provides signal input including a brake pedal position indicating an operator request for vehicle braking. The transmission range selector provides signal input indicating direction of operator-intended motion of the vehicle including a discrete number of operator-selectable positions indicating the preferred rotational direction of the output member 62 in either a forward or a reverse direction.

The powertrain system 20 includes a communications scheme including the communications bus 18 to effect communication in the form of sensor signals and actuator command signals between the control system 10 and elements of the powertrain system 20. The communications scheme effects information transfer to and from the control system 10 using one or more communications systems and devices, including, e.g., the communications bus 18, a direct connection, a local area network bus, a serial peripheral interface bus, and wireless communications.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communications bus link, a wireless link or any another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

FIGS. 2 through 7 schematically show flowcharts detailing a regenerative braking torque capacity control routine (control routine) 200 for controlling an embodiment of the powertrain system 20 to transfer tractive torque and braking torque to the driveline 60 described with reference to FIG. 1. Overall, the control routine 200 executes in response to operator inputs, including operator inputs to the accelerator pedal 15 and the brake pedal 16, including when the operator input to the accelerator pedal 15 is less than a minimum threshold that indicates coasting or braking. The control routine 200 arbitrates between a short-term axle torque capacity 405, a long-term axle torque capacity 505 and a maximum regenerative braking stall torque capacity 605 to select a preferred regenerative braking capacity 205 based upon an operator request for braking 106, a present transmission gear state 104 and an anticipated or predicted future transmission gear state 105. As employed herein, the term 'short-term' refers to any operation that is applied or implemented within one iteration of a control routine. As employed herein, the term 'long-term' refers to any operation that is applied or implemented over multiple iterations of a control routine. As employed herein, the term 'capacity' refers to a maximum or minimum magnitude of controlled operation, e.g., braking, that the relevant system is able to accomplished taking into account mechanical, electrical, and other factors.

Torque output from the electric motor/generator 35 that is transferred to the driveline 60 to effect vehicle braking is controlled to apply regenerative braking responsive to the preferred regenerative braking capacity 205, taking into account factors related to capabilities to generate and transfer torque and power between the engine 40, the pulley mechanism 38, the electric machine 35, the battery 25, the torque converter 44, the transmission 50 and the driveline 60 to the vehicle wheels 66. This includes a short-term axle capacity calculation routine 400 that determines the short-term axle torque capacity 405, a long-term axle capacity calculation routine 500 that determines the long-term axle torque capacity 505, and an engine stall prevention routine 600 that determines the maximum regenerative braking stall torque capacity 605. A net regenerative braking capacity arbitration routine 700 determines the preferred regenerative braking capacity 205 based upon the short-term axle torque capacity 405, the long-term axle torque capacity 505 and the maximum regenerative braking stall torque capacity 605. The regenerative braking applied by the powertrain system 100 may differ from the preferred regenerative braking capacity 205 due to operational factors related to battery capacity and powertrain operation.

The short-term axle capacity calculation routine 400 determines the short-term axle torque capacity 405 based upon inputs including a short-term (ST) crankshaft torque capacity 102 and a current transmission state 104, and whether the torque converter clutch of the torque converter 44 is in a locked state or an unlocked state, and whether the transmission 50 is undergoing gear shifting. The current transmission state 104 indicates the step-gear in which the transmission 50 is presently operating. This operation is best shown with reference to FIG. 4.

Routine 410 relates to determining the short-term axle torque capacity 405 when the torque converter clutch of the torque converter 44 is in the locked state. The short-term (ST) crankshaft torque capacity 102 is multiplied by the current gear ratio associated with the current transmission state 104 of the transmission in routine 420 to determine a short-term powertrain output torque limit 425, which is combined with routine 430, e.g., divided by axle ratio 112 of the driveline 60 to determine the short-term axle torque capacity 405 when the torque converter clutch of the torque converter 44 is in the locked state.

Routine 440 relates to determining the short-term axle torque capacity 405 when the torque converter clutch of the torque converter 44 is in the unlocked state. The short-term (ST) crankshaft torque capacity 102 and the current gear ratio associated with the current transmission state 104 are employed by a torque converter conversion routine 450 to determine a short-term powertrain output torque limit 455 based upon the torque conversion of the torque converter 44 in the unlocked state, and current gear ratio associated with the current transmission state 104. The torque conversion of the torque converter 44 in the unlocked state may be determined using a K factor specific to an embodiment of the torque converter 44 that correlates speed and torque when operating at a stall speed. The short-term powertrain output torque limit 455 is combined with routine 460, e.g., divided by axle ratio 112 of the driveline 60 to determine the short-term axle torque capacity 405 when the torque converter clutch of the torque converter 44 is in the unlocked state.

Routine 470 relates to determining the short-term axle torque capacity 405 when the transmission 50 is undergoing gear shifting. Under some conditions related to clutch control in the transmission 50, negative or braking torque may be transferred through the transmission 50 during gear shifting, permitting regenerative braking operation through the shift, with a magnitude of regenerative braking controlled to maintain and provide acceptable shift quality as perceived by the vehicle operator. This includes latching (480) a trigger 474 at the beginning of a shift 472 when regenerative braking is being applied, thus capturing a magnitude of regenerative braking at the start of the shift 485. The magnitude of regenerative braking at the start of the shift 485 is compared to an upper regenerative braking limit for an upshift 484, and a minimum of the two values is selected (486) as a regenerative braking magnitude 487. The regenerative braking magnitude 487 is applied as the short-term axle torque capacity 405 so long as it is has a negative value between 0 and −9999 (490).

FIG. 8 graphically shows operation of portions of the control routine 200 on an embodiment of the vehicle 100 including the powertrain system 20, including applied regenerative braking 814 in Nm, and regenerative braking capacity 812 in Nm, in relation to vehicle speed 818 in kph, selected transmission gear state 816, operator request for braking 820 in %, and occurrence of transmission shifting 822 in True (1) and False (0), all in relation to time 840, shown on the horizontal axis. Magnitudes of the regenerative braking terms 804 are indicated by the leftward vertical axis, and magnitudes of the vehicle speed 806 and braking 808 are indicated by the rightward vertical axis. Initially, the regenerative braking capacity 812 is −200 Nm, until timepoint 841, when braking is applied, as indicated by the operator request for braking 820. At timepoint 841, shifting is commanded 822(1), and the regenerative braking capacity 812 is currently being commanded to 0 Nm, until the shift is completed at timepoint 842. At that point, the regenerative braking capacity 812 is set at −150 Nm, due to the drive request which was initiated during the shift, and the applied regenerative braking 814 ramps in.

At the subsequent upshift at timepoint 843, regenerative braking is commanded to −150 Nm, below the regenerative braking threshold. During the shift that occurs between timepoints 843 and 844, the applied regenerative braking 814 is held constant, as is the regenerative braking capacity 812. Following the shift's completion, the applied regenerative braking 814 is allowed to increase again. As the vehicle decelerates, indicated by the vehicle speed 818 after timepoint 843, downshifts occur, as indicated at timepoints 846 and 847. The applied regenerative braking 814 and regenerative braking capacity 812 follow the normal path of control, i.e., a normal ramp-out of regenerative braking that follows the long-term axle torque capacity 205, which may be determined in the control routine 200 described with reference to FIGS. 2-7.

The long-term axle capacity calculation routine 500 determines the long-term axle torque capacity 505 based upon inputs including the predicted gear state 105 and a predicted crankshaft torque capacity or limit 305, and whether the torque converter clutch of the torque converter 44 is in a locked state or an unlocked state, and whether the transmission 50 is undergoing gear shifting. This operation is best shown with reference to FIG. 5. The predicted crankshaft torque capacity or limit 305 is determined as best shown with reference to FIG. 3. The predicted transmission gear state 105 is a transmission gear state that the control routine 200 anticipates the transmission 50 will shift to in response to changes in operator inputs to the accelerator pedal 15 and the brake pedal 16, including those that may lead to regenerative braking. By way of example, the transmission 50 may be calibrated to downshift to a next lower transmission gear in response to an operator input to the accelerator pedal 15 that indicates coasting.

Figure 3:
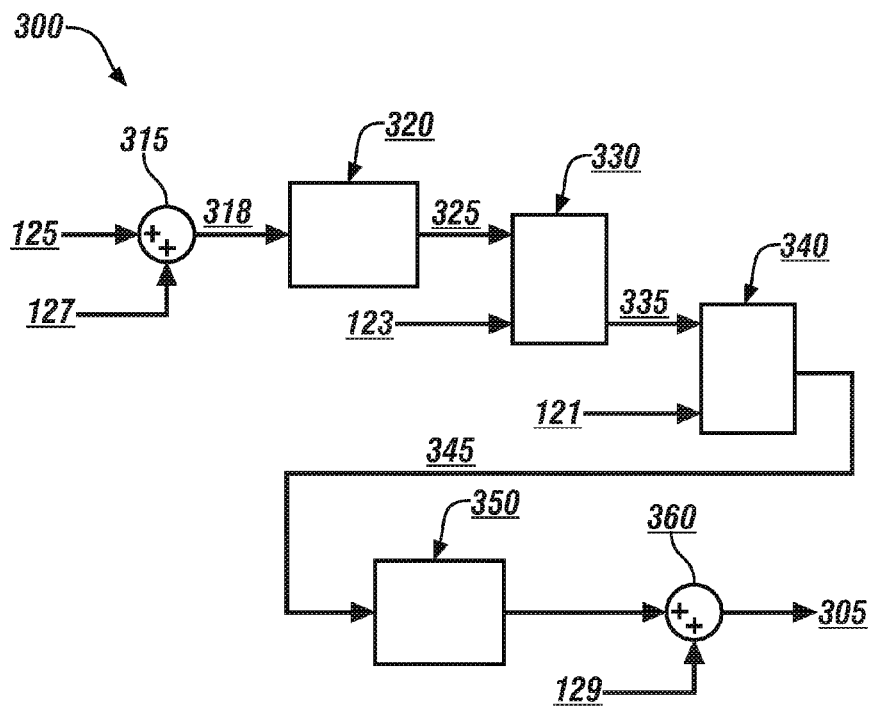
Figure 4:
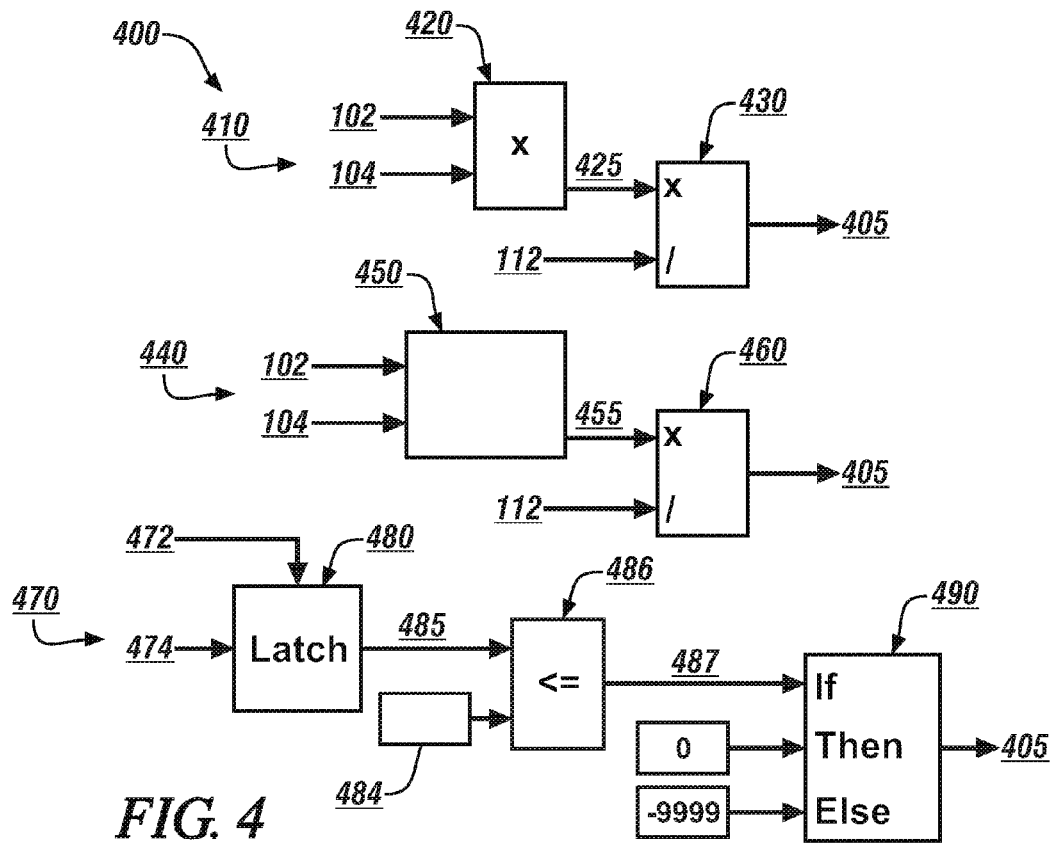
Figure 5:
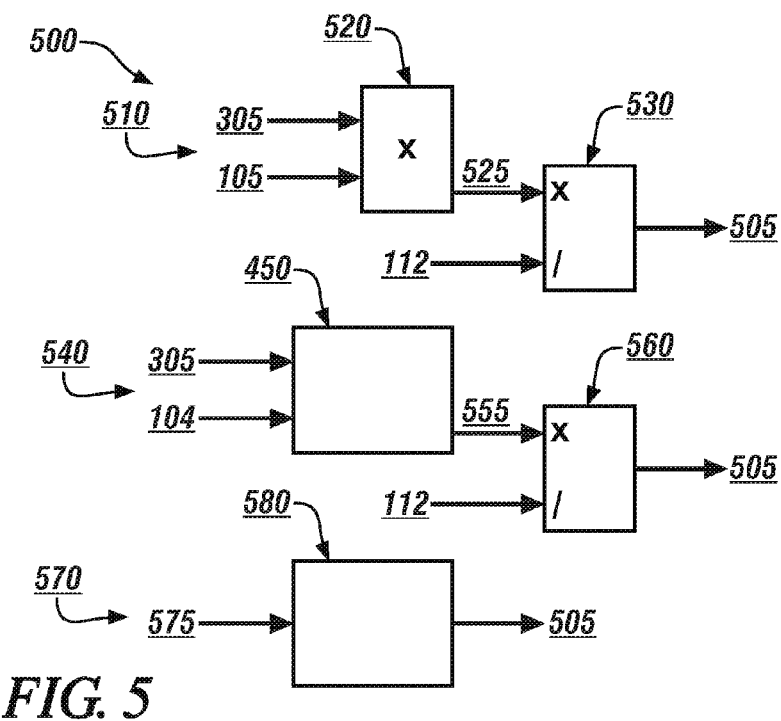

FIG. 3 schematically shows a routine 300 for determining the predicted crankshaft torque capacity 305. Inputs include a maximum belt slip torque 125 and related belt slip terms 127, which are combined (315) to define a maximum belt torque 318 that can be transferred between the crankshaft 36 of the internal combustion engine 40 and a rotating shaft of the motor/generator 35 across the pulley mechanism 38. The maximum belt torque 318 is converted to a motor torque 325 (320), and the motor torque 325 is compared with a motor torque limit that is determined based upon battery power 123. A maximum motor torque 335 of the motor torque 325 and the motor torque limit based upon battery power 123 is selected (330), and the maximum motor torque 335 is compared with a motor torque limit 121 (340), wherein the motor torque limit 121 is based upon the mechanical and electrical capabilities of the motor/generator 32. A second maximum motor torque 345 is converted to a crankshaft torque (350) and combined with crankshaft torque limits 129 (360) to determine the predicted crankshaft torque capacity 305.

Referring again to FIG. 5, routine 510 relates to determining the long-term axle torque capacity 505 when the torque converter clutch of the torque converter 44 is in the locked state. The predicted crankshaft torque capacity 305 is multiplied (520) by the predicted gear ratio 105 of the transmission to determine a long-term powertrain output torque limit 525, which is combined with (530), e.g., divided by the axle ratio 112 of the driveline 60 to determine the long-term axle torque capacity 505 when the torque converter clutch of the torque converter 44 is in the locked state.

Routine 540 relates to determining the long-term axle torque capacity 505 when the torque converter clutch of the torque converter 44 is in the unlocked state. The predicted crankshaft torque capacity 305 and the current gear ratio associated with the current transmission state 104 are employed by the torque converter conversion routine 450 to determine a long-term powertrain output torque limit 555 based upon the torque conversion of the torque converter 44 in the unlocked state, and the current gear ratio associated with the current transmission state 104. The torque conversion of the torque converter 44 in the unlocked state may be determined using the K factor specific to the torque converter 44. The long-term powertrain output torque limit 555 is combined with (560), e.g., divided by the axle ratio 112 of the driveline 60 to determine the long-term axle torque capacity 505 when the torque converter clutch of the torque converter 44 is in the unlocked state.

Routine 570 relates to determining the long-term axle torque capacity 505 when the transmission 50 is undergoing gear shifting. When the transmission 50 is undergoing gear shifting, as indicated by a signal input 575 from the transmission 50, the long-term axle torque capacity 505 is set equal to zero to allow for all shifts (580).

Figure 6:
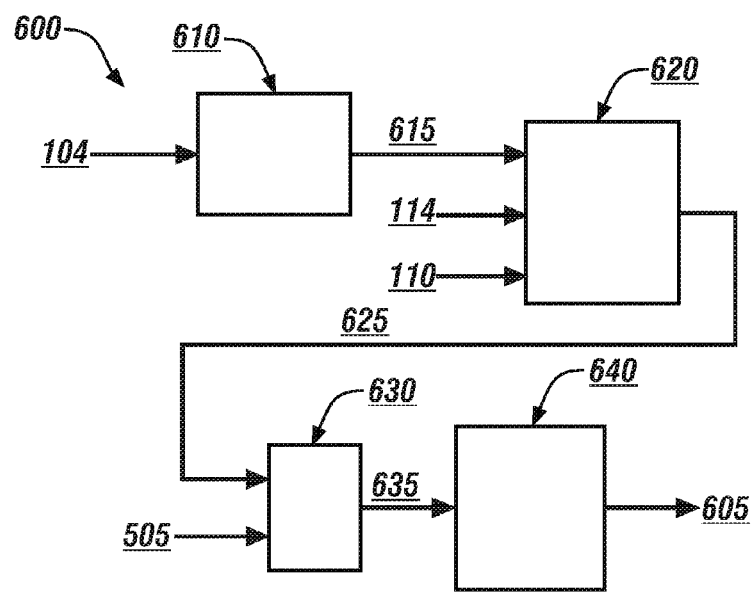

FIG. 6 schematically shows an embodiment of the engine stall prevention routine 600 to determine the maximum regenerative braking stall torque capacity 605 that is intended to prevent engine stalling that may be caused by regenerative braking at low engine speeds. The engine stall prevention routine 600 monitors the current gear ratio associated with the current transmission state 104, which is subjected to range state arbitration (610) to select either the current gear ratio associated with the current transmission state 104 or the predicted transmission state as the arbitrated transmission state 615, which is combined with transmission temperature 114 and vehicle speed 110 (620) to determine a minimum axle torque for engine stalling 625, wherein engine stalling occurs when engine speed falls below a minimum engine speed, such as 400 RPM. The minimum axle torque for engine stalling 625 is compared with the long-term axle torque capacity 505, and a maximum value 635 is selected (630). The selected maximum value 635 of the minimum axle torque for engine stalling 625 and the long-term axle torque capacity 505 is employed to calculate a net effective regenerative braking term (640), which is the maximum regenerative braking stall torque capacity 605. Thus, in the event of a fault related to a command to release the torque converter clutch, the transmission 50 may release the torque converter clutch to protect hardware, which may cause regenerative braking to be applied at low speed conditions, and thus affect drive quality. Instead, the engine stall prevention routine 600 ramps out regenerative braking using transmission temperature, transmission state and vehicle speed to improve drive quality. Such operation permits arbitration of the transmission range state to exclude the state of the torque converter clutch to limit axle torque per gear, and thus limits regenerative braking capacity as a function of vehicle speed (and indirectly engine speed) to prevent excessive regenerative braking during sudden torque converter clutch release, and limits maximum regenerative braking capacity based upon transmission temperature.

Figure 7:
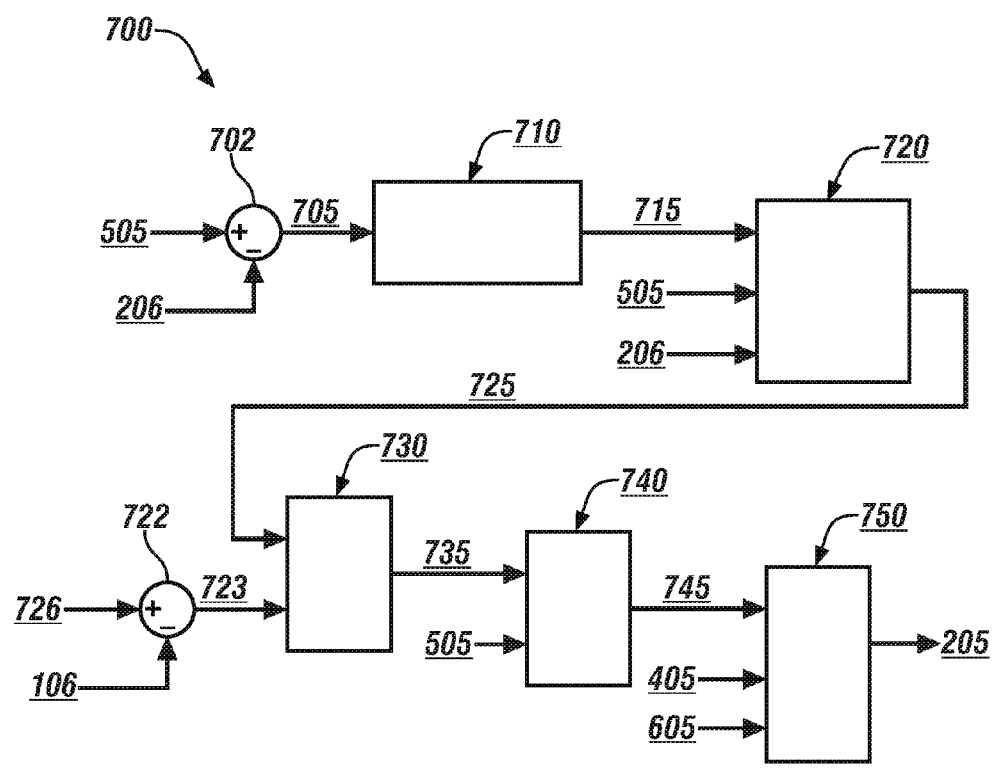

FIG. 7 schematically shows an embodiment of the net regenerative braking capacity arbitration routine 700 to determine the preferred regenerative braking capacity 205 based upon the short-term axle torque capacity 405, the long-term axle torque capacity 505 and the maximum regenerative braking stall torque capacity 605. The long-term axle torque capacity 505 is compared with a net regenerative braking capacity 206 from an immediately previous iteration of the control routine 200 (702) to determine a differential regenerative braking capacity 705, which is employed to determine a time-rate regenerative braking ramp rate 715 (710). The time-rate regenerative braking ramp rate 715 is combined with the long-term axle torque capacity 505 and the previous net regenerative braking capacity 206 using a gradient limiter routine (720), which generates an updated long-term axle torque capacity 725 that includes control routines for ramping toward less long term torque capacity and immediately changing to a greater amount of long term torque capacity.

A creep coast torque 726 may be determined based upon vehicle speed, and reduced by the operator request for braking 106 (722) to determine an operator requested braking torque 723, which is compared with the updated long-term axle torque capacity 725. The one of the operator requested braking torque 723 and the updated long-term axle torque capacity 725 that provides less regenerative torque is selected (730) as input 735, which is compared with the long-term axle torque capacity 505 (740), from which a minimum (more regenerative braking torque) is selected as a resultant long-term torque 745. The resultant long-term torque 745 is compared with the short-term axle torque capacity 405 and the maximum regenerative braking stall torque capacity 605 (750). The one of the resultant long-term torque 745, the short-term axle torque capacity 405 and the maximum regenerative braking stall torque capacity 605 that achieves a minimum magnitude of regenerative braking torque is selected as the preferred regenerative braking capacity 205.

As such, the control routine 200 ramps out regenerative braking prior to transmission upshifts to improve shift quality, or holds regenerative braking steady through a shift to have proper axle torque when control is returned at the end of the shift. This includes allowing regenerative braking during some upshifts based on capability of the transmission to carry regenerative torque, including using transmission clutch control to predict torque carrying capability, and manipulating short-term capacity to step out regenerative braking during shifting if needed. This includes utilizing hybrid motor limits, current and predicted transmission range states, transmission operating parameters, and torque converter clutch release points to apply additional regenerative braking.

The control routine 200 described herein facilitates determining long-term crankshaft capacity using predicted transmission state, and employing transmission parameters to convert short-term and long-term crankshaft capacities to axle domain regenerative braking capacities. This includes using the current transmission state in a short-term axle domain regenerative capacity calculation and using the predicted transmission state in a long-term axle domain regenerative capacity calculation. Arbitration permits combining the regenerative braking capacity into a single effective axle torque capacity.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling an electric machine disposed to generate tractive torque in a powertrain system of a vehicle, wherein the powertrain system is configured in a series arrangement including the electric machine rotatably coupled to a crankshaft of an internal combustion engine that is coupled via a torque converter to a transmission, and wherein an output member of the transmission is coupled to an axle of a driveline that is coupled to vehicle wheels, the method comprising:
   determining a short-term axle torque capacity, a long-term axle torque capacity and a maximum regenerative braking stall torque capacity;
   determining an operator request for braking;
   dynamically determining a desired regenerative braking capacity based upon the short-term axle torque capacity, the long-term regenerative braking capacity, the engine stall regenerative braking capacity and the operator request for braking; and
   controlling, via a controller, a torque output from the electric machine that is transferred to the driveline to effect vehicle braking based upon the desired regenerative braking capacity.

2. The method of claim 1, further comprising:
   determining a present transmission gear state and an anticipated transmission gear state; and
   dynamically determining the desired regenerative braking capacity based additionally upon the present transmission gear state and the anticipated transmission gear state.

3. The method of claim 1, comprising determining the short-term axle torque capacity based upon a short-term crankshaft torque capacity and a current transmission gear state when a torque converter clutch is locked.

4. The method of claim 1, comprising determining the short-term axle torque capacity based upon a short-term crankshaft torque capacity, a current transmission gear state and a torque conversion of the torque converter in the unlocked state when a torque converter clutch is unlocked.

5. The method of claim 1, comprising determining the short-term axle torque capacity based upon a magnitude of regenerative braking at the start of a shift event when the transmission is executing a shift event.

6. The method of claim 1, further comprising:
determining a predicted crankshaft torque capacity; and
determining the long-term axle torque capacity based upon the predicted crankshaft torque capacity.

7. The method of claim 6, wherein the powertrain system further comprises a DC power source electrically connected to the electric machine; and wherein determining the predicted crankshaft torque capacity comprises:
determining a maximum belt torque that can be transferred between the internal combustion engine and the electric machine;
determining a maximum motor torque limit based upon battery power associated with the DC power source; and
determining the predicted crankshaft torque capacity based upon the maximum belt torque and the maximum motor torque limit.

8. The method of claim 1, wherein determining the maximum regenerative braking stall torque capacity comprises determining a regenerative braking capacity associated with engine stalling, and determining the maximum regenerative braking stall torque capacity based upon the regenerative braking capacity associated with engine stalling.

9. The method of claim 1, wherein determining the desired regenerative braking capacity based upon the short-term axle torque capacity, the long-term regenerative braking capacity, the engine stall regenerative braking capacity and the operator request for braking further comprises arbitrating between the short-term axle torque capacity, the long-term regenerative braking capacity and the engine stall regenerative braking capacity.

10. A method for controlling a powertrain system configured in a series arrangement including an electric machine rotatably coupled to a crankshaft of an internal combustion engine that is coupled to a step-gear transmission via a torque converter including a torque converter clutch, wherein an output member of the transmission is coupled to an axle of a driveline of a vehicle, the method comprising:
determining a short-term axle torque capacity, a long-term axle torque capacity and a maximum regenerative braking stall torque capacity;
determining an operator request for braking;
dynamically determining a desired regenerative braking capacity based upon the short-term axle torque capacity, the long-term regenerative braking capacity, the engine stall regenerative braking capacity and the operator request for braking; and
controlling, via a controller, the electric machine to generate torque that is transferred to the output member of the transmission to effect vehicle braking via the driveline based upon the desired regenerative braking capacity.

11. The method of claim 10, comprising determining the short-term axle torque capacity based upon a short-term crankshaft torque capacity and a current transmission step-gear state when the torque converter clutch is locked.

12. The method of claim 10, comprising determining the short-term axle torque capacity based upon a short-term crankshaft torque capacity, a current transmission step-gear state and a torque conversion of the torque converter in the unlocked state when the torque converter clutch is unlocked.

13. The method of claim 10, comprising determining the short-term axle torque capacity based upon a magnitude of regenerative braking at the start of a shift event when the step-gear transmission is executing the shift event.

14. The method of claim 10, further comprising:
determining a predicted crankshaft torque capacity; and
determining the long-term axle torque capacity based upon the predicted crankshaft torque capacity.

15. The method of claim 14, wherein the powertrain system further comprises a DC power source electrically connected to the electric machine; and wherein determining the predicted crankshaft torque capacity comprises:
determining a maximum belt torque that can be transferred between the internal combustion engine and the electric machine,
determining a maximum motor torque limit based upon battery power associated with the DC power source, and
determining the predicted crankshaft torque capacity based upon the maximum belt torque and the maximum motor torque limit.

16. The method of claim 11, wherein determining the maximum regenerative braking stall torque capacity comprises determining a regenerative braking capacity associated with engine stalling, and determining the maximum regenerative braking stall torque capacity based upon the regenerative braking capacity associated with engine stalling.

17. A powertrain system, comprising:
an electric machine, an internal combustion engine, and a step-gear transmission;
the electric machine rotatably coupled to a crankshaft of the internal combustion engine and electrically connected to a DC power source;
the internal combustion engine coupled to the step-gear transmission via a torque converter including a torque converter clutch;
the step-gear transmission including an output member coupled to an axle of a driveline; and
a controller operatively connected to the internal combustion engine, the electric machine, the transmission and the torque converter clutch, the controller including an instruction set, the instruction set executable to:
determine a short-term axle torque capacity, a long-term axle torque capacity and a maximum regenerative braking stall torque capacity, wherein the maximum regenerative braking stall torque capacity is determined based upon a minimum axle torque associated with engine stalling;
determine an operator request for braking;
dynamically determine a desired regenerative braking capacity based upon the short-term axle torque capacity, the long-term regenerative braking capacity, the engine stall regenerative braking capacity and the operator request for braking; and
control the electric machine to generate torque that is transferred to a driveline to effect braking based upon the desired regenerative braking capacity.

18. The powertrain system of claim 17, comprising the instruction set executable to determine the short-term axle torque capacity based upon a short-term crankshaft torque capacity, a current transmission step-gear state and a torque conversion of the torque converter in the unlocked state when a torque converter clutch is unlocked.

19. The powertrain system of claim 17, further comprising a DC power source electrically connected to the electric machine; and
the instruction set executable to:
determine a predicted crankshaft torque capacity; and
determine the long-term axle torque capacity based upon the predicted crankshaft torque capacity.

20. The powertrain system of claim 19, wherein the powertrain system further comprises a DC power source electrically connected to the electric machine; and wherein the instruction set executable to determine the predicted crankshaft torque capacity comprises the instruction set executable to:
- determine a maximum belt torque that can be transferred between the internal combustion engine and the electric machine;
- determine a maximum motor torque limit based upon battery power associated with the DC power source; and
- determine the predicted crankshaft torque capacity based upon the maximum belt torque and the maximum motor torque limit.

* * * * *